June 20, 1961
J. A. DREYER
2,989,195
HANDLING APPARATUS
Filed Nov. 15, 1957
3 Sheets-Sheet 1
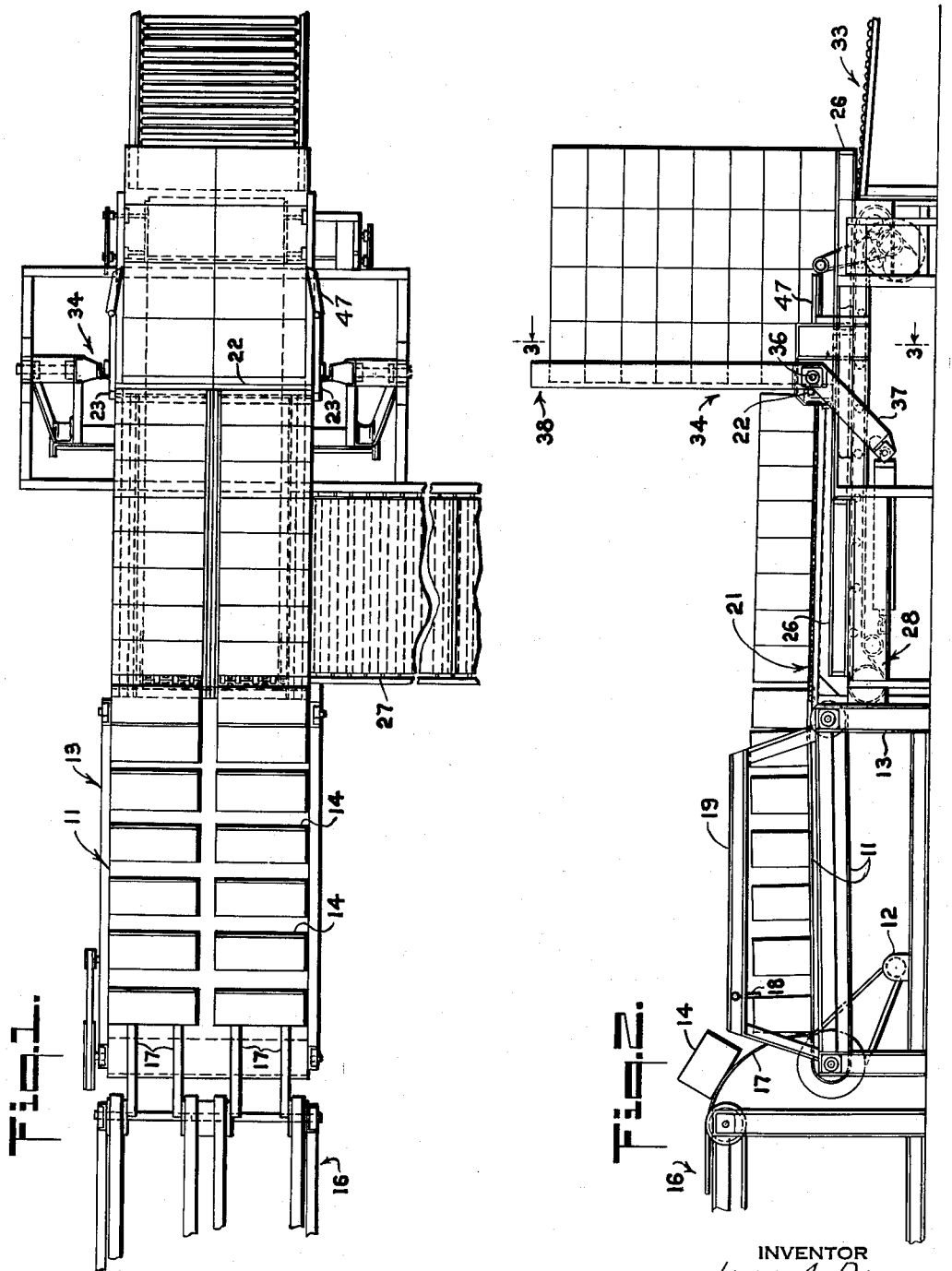
INVENTOR
JOHN A. DREYER
BY
Gardner + Zimmerman
ATTORNEYS June 20, 1961 J. A. DREYER 2,989,195
HANDLING APPARATUS
Filed Nov. 15, 1957 3 Sheets-Sheet 3
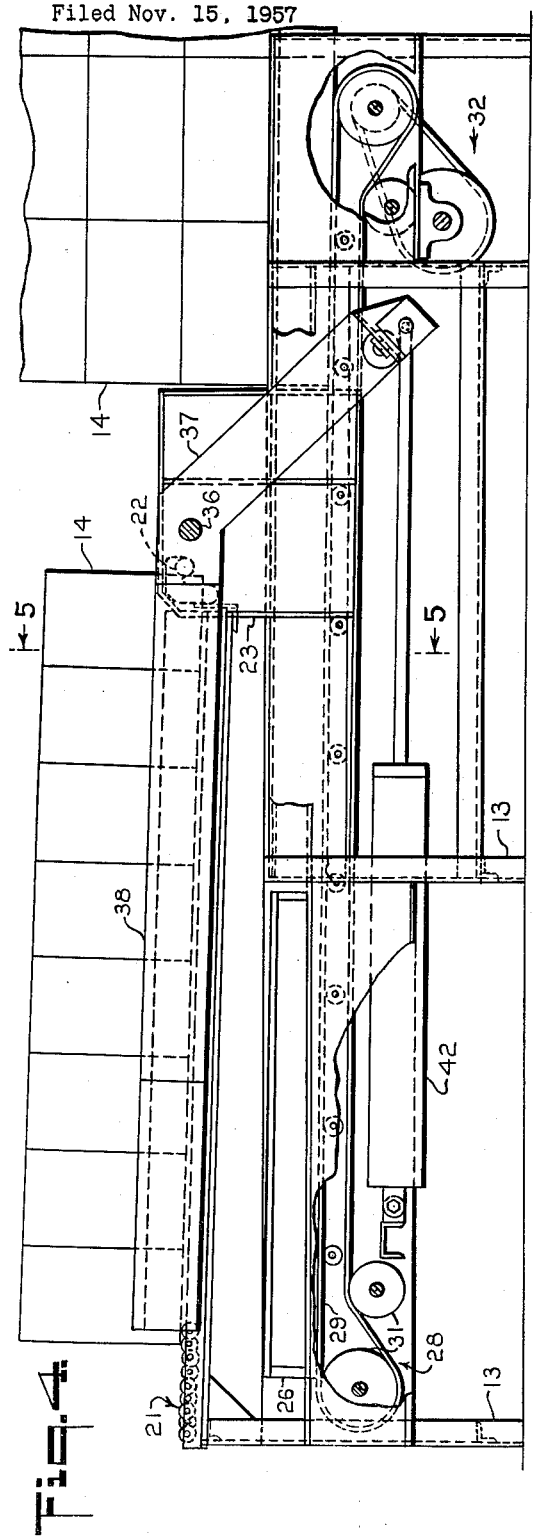
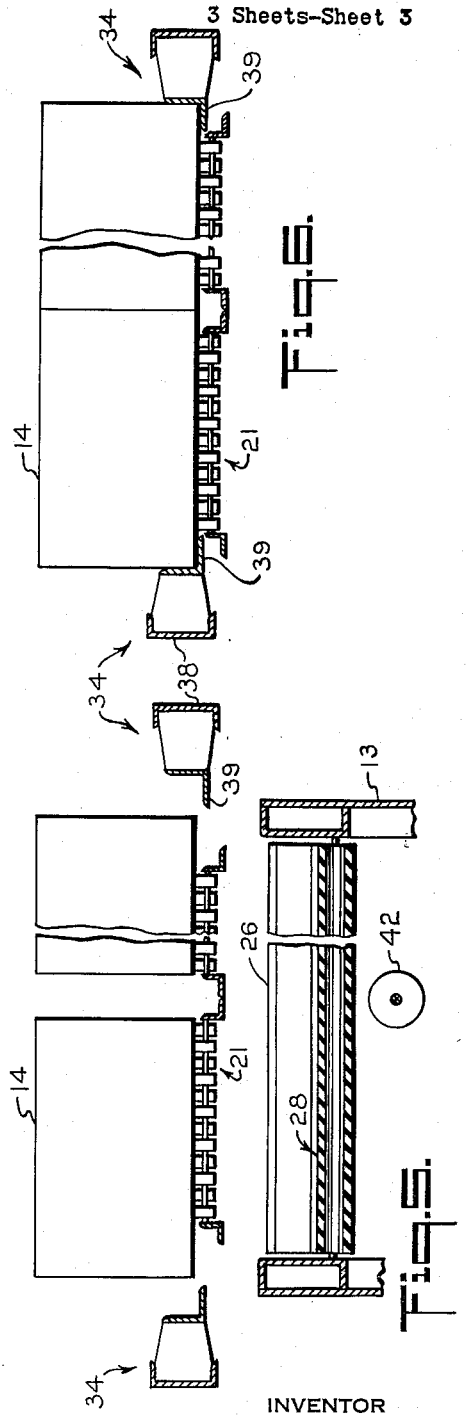
INVENTOR
JOHN A. DREYER
BY
Gardner & Zimmerman
ATTORNEYS United States Patent Office 2,989,195
Patented June 20, 1961

2,989,195
HANDLING APPARATUS
John A. Dreyer, Hayward, Calif., assignor to Benner-Nawman, Inc., Oakland, Calif., a corporation of California
Filed Nov. 15, 1957, Ser. No. 696,695
7 Claims. (Cl. 214—6)

The present invention relates in general to apparatus for handling objects such as containers of a regular configuration and more particularly to apparatus for the loading of objects such as boxes in predetermined order upon pallets or the like.

Although the present invention may be variously employed in the semi-automatic movement and placement of objects, it is particularly adapted to the stacking of boxes upon pallets, and the problem of rapid and facile handling of empty produce boxes in completely solved through the present invention. In any process or industry wherein a large number of like containers are transported and positioned during processing the problem of efficient handling thereof arises and the canning industry is no exception. Great strides have been made in the automatic and semi-automatic positioning and transport both of produce and of containers. One of the remaining problems has been in the disposition of reusable boxes or crates which are employed to hold fresh produce and which, after unloading, must be readied for return to loading areas. It is the general practice to stack such boxes upon conventional wooden pallets for redelivery to fields or orchards. In a large canning operation, as is now common, considerable effort is expended in the handling of the boxes after emptying same, for a great number of boxes are involved.

The present invention provides means for loading pallets with produce boxes in contiguous stacks thereon without manually handling the boxes. The entire operation from receipt of the boxes from a conveyor to loaded pallet removal requires no human contact with either pallet or boxes.

More specifically, the invention provides means for removing groups of boxes periodically from such as a conveyor and stacking same upon a pallet which is indexed thereto for movement so that consecutive stacks are contiguous. The apparatus in no way interferes with the flow of boxes but only removes groups thereof and provision is made for vertically aligning the boxes of each stack and preventing stack tipping or slippage. In addition to the combined box and pallet feed, provision is made for quite simply eliminating the entire pallet operation so that individual boxes are fed from the device in upright position, as might be intermittently required under certain circumstances.

It is an object of the present invention to provide improved handling means for positioned stacking of regularly shaped objects.

It is another object of the present invention to provide means for successively removing groups of containers from a flow thereof and placing same in contiguous stacks.

It is a further object of the present invention to provide apparatus for stacking boxes on pallets with indexed stacking and pallet moving means for controlled stack positioning.

It is yet another object of the present invention to provide apparatus for loading empty boxes on a pallet wherein a steady flow of boxes is uninterrupted by stacking operations.

The invention possesses other objects and features of advantage, some of which, with the foregoing, will be set forth in the following description of the preferred form of the invention which is illustrated in the drawings accompanying and forming part of the specification. It is to be understood, however, that variations in the showing made by the said drawings and description may be adopted within the scope of the invention as set forth in the claims.

The invention is illustrated in the accompanying drawings wherein:

FIGURE 1 is a plan view of the apparatus of the invention.

FIGURE 2 is a side elevational view of the apparatus.

FIGURE 4 is an enlarged side elevational view of the stacking portion of the apparatus shown in position immediately preceding raising of a group of boxes for stacking.

FIGURE 5 is a partial sectional view taken in a vertical plane through 5—5 of FIGURE 4.

FIGURE 6 is a part of the same view as FIGURE 5 but showing the arms gripping the boxes for stacking.

Figure 3:
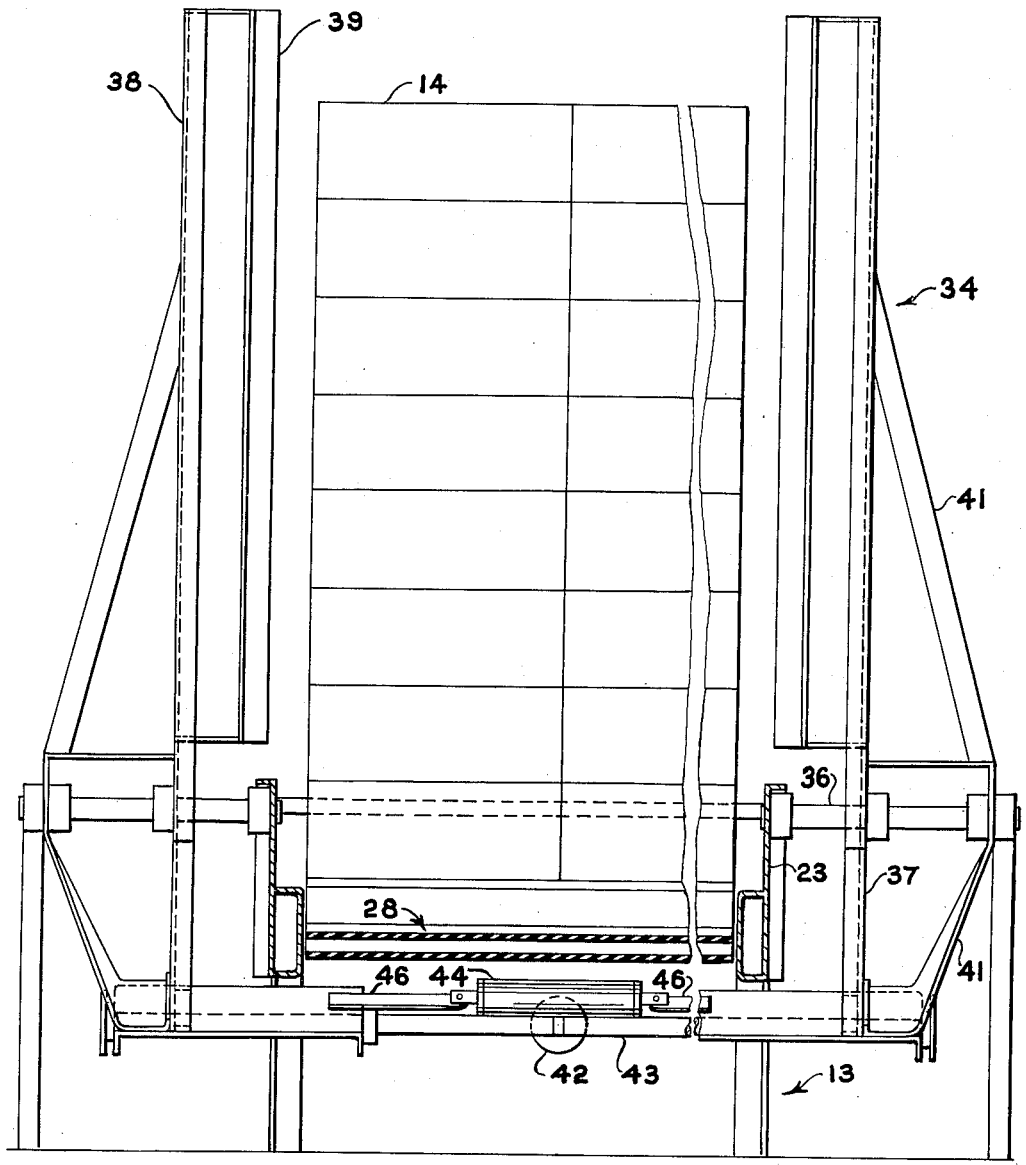
FIGURE 3 is an enlarged sectional view taken in a vertical plane at 3—3 of FIGURE 2.

Considering now the invention in some detail and referring first to FIGURES 1 and 2, there is provided a box feed means including a conveyor 11 driven at a constant speed from such as a motor 12 and mounted upon a rigid frame 13 with the plane thereof inclined gradually upwards in the direction of conveyor travel. This conveyor 11 is adapted to receive objects such as boxes 14 from a suitable source, as for example another conveyor means 16 located somewhat above same and discharging boxes onto the conveyor 11. In normal practice boxes are delivered from a box dumper or the like (not shown) by such as the conveyor means 16 with the large or bottom side down, as shown, and herein four curved guides 17 are provided from the end of the conveyor means 16 to the conveyor 11 of the present invention so that boxes slide thereupon to alight on the conveyor 11 upon the sides thereof. Preferably a double row of boxes are provided by the conveyor means 16 and the curved guides 17 align these boxes upon the conveyor 11 in double rows whereupon they are transported gently upwards to the end of the conveyor. A flat type stop 18 mounted upon frame rails 19 above the conveyor 11 adjacent the beginning end thereof is disposed to arrest the boxes at the top thereof after they slide down the guides 17 to prevent box inversion, and the rails 19 prevent lateral box displacement on the conveyor 11.

At the upper outlet end of the conveyor 11 and as a further portion of the box feed means there is provided a first gravity roller section 21 of the skate wheel type, for example, disposed in close proximity with the end of the conveyor 11 and inclined gradually downward therefrom so that boxes are discharged from the conveyor onto the roller section and move therealong by initial momentum and gravity. The roller section 21 may be formed as two adjacent parallel units separated by a structural member such as a channel and the total width of the roller section is less than the width of two boxes so that as two rows of boxes are pushed onto the section from the conveyor the boxes overhang the edges of the roller section. Also the roller section 21 is made longer than the desired height of the box stacks to be formed for it is from this roller section that groups of boxes are removed for stacking.

Provision is made for stopping box traverse on the roller section 21 and to this end a bar 22 extends across the section adjacent the lower end thereof. This stop bar 22 is mounted in a pair of plates or rigid members 23 extending upward from the aforementioned frame 13 which also mounts the roller section and in each plate there is provided an inverted L-shaped slot with a depression at the end of the upper generally horizontal portion thereof. As may be seen in FIGURES 2 and 3, the stop bar 22 is thus provided with two stable positions, one across the end of the roller section above same and the other across the end of the roller section aligned with or below same. In the upper bar position boxes are arrested thereby so that boxes roll down thereto and eventually fill the roller section in that they pile up behind the stop bar 22.

In addition to the above described box feed there is also provided pallet feed means for supplying pallets 26 and disposing same in a loading zone in position to receive boxes that are stacked thereon by means later to be described. The pallet feed system includes one or more gravity roller sections 27 disposed to feed at right angles to the box roller section 21 below same and a pallet conveyor belt 28 disposed beneath and parallel to the box roller section 21 and extending beyond same the length of the loading zone equal to at least one pallet length. As regards the pallet conveyor belt 28, same will be seen in FIGURE 4 to include an elongated endless belt 29 of roughened material extending over drums 31 and driven thereby from suitable intermittent drive means 32 such as a Geneva or like type. Rollers may be provided to prevent sagging of the belt. Pallets 26 move onto the driven conveyor belt 28 from the pallet roller section 27 and are subsequently moved into the loading zone of the apparatus thereby. Beyond the outlet end of the pallet conveyor 28 there is provided an outlet gravity roller section 33 leading therefrom and adapted to receive loaded pallets from the pallet conveyor 28 and to carry same away to a removed position where they may, for example, be loaded on trucks for transportation to areas where the boxes are reused or stored.

Considering now the actual stacking operation of the invention and the elements connected therewith, there are provided a pair of elevator arms 34 mounted upon a pair of shafts 36 disposed laterally of the roller section on opposite sides thereof. These shafts are preferably disposed above the outlet end of the box roller section and in alignment with the stop bar 22 beyond the roller section. These elevator arms 34 each include lower pivot members 37 attached in rotatable relation to the shafts 36 and extending downward below the pallet conveyor 28, and upper extensions 38 having an L cross section including bottom planar portions 39 joined to upright reinforcing portions for rigidity of construction. The arm extensions 38 have a length in excess of the maximum stack height of boxes to be stacked on pallets and normally extend substantially the length of the box roller section although disposed to fall short of the entrance end thereof. Considering further the elevator arms 34 and the mounting thereof, reference is made to FIGURE 3 wherein it will be seen that the shafts 36 extend outward from the plates 23 to rigid members of the frame 13. The pivot member 37 of each arm 34 is adapted to pivot about the shaft axis as by rotatable mounting on the shaft 36 as a fixed axis above and normal to the roller section 21 to move arm 34 in a vertical arcuate path from a first position outwardly alongside and longitudinally of roller section 21 to a second substantially vertical position normal to and outwardly adjacent the lower end of the roller section. Suitable strengthening members 41 are affixed to the arm extensions 38 and likewise rotatably mounted on the shaft. In addition to the aforementioned vertical pivotal motion of the elevator arms a further degree of motion is provided thereto in that these arms are movable laterally of the roller section toward and away from each other. To this end the arm pivot members 37, and strengthening members 41 are slidably mounted on the shafts 36. Suitable stops may be provided to limit this lateral motion of the elevator arms and these limits are set at an arm position sufficiently outward of the roller section 21 to clear two rows of boxes thereon, as shown in FIGURE 5, and sufficiently inward to forceably engage two rows of boxes on the roller section, as shown in FIGURE 6.

Actuation of the elevator arms is accomplished with a first hydraulic cylinder 42 having one end pivotally secured to a rigid frame cross member and extending generally horizontally beneath the pallet conveyor belt 28 with a piston rod thereof pivotally pinned to the lower end of the pivot members 37 of the elevator arms 34 as by a lateral bar 43 that slidably engages same. It will be seen that extension and retraction of the hydraulic cylinder piston will cause the elevator arms 34 to pivot in vertical planes about the shafts 36. Lateral motion of the elevator arms is produced by a second hydraulic cylinder 44 having opposed pistons connected as by rods 46 to the lower ends of the arm pivot members 37 and strengthening members 41 so that extension of the cylinder pistons forces the extension arms laterally outward away from the roller section 21 and boxes 14 thereon and retraction of the cylinder pistons draws together the extension arms.

Certain additional members of the apparatus are provided to produce the smooth trouble free operation required of devices of this type and in this category are a pair of plates 47 disposed in the loading zone with one on each side of the pallet conveyor substantially a box width behind the shafts 36 and spring loaded to extend over the pallet conveyor and resist pivoting outwardly thereof. These plates 47 are located above the pallet conveyor as by mounting upon rails of the frame 13 and are displaced from the pivot shafts 36 of the arms 34 a distance substantially equal to the width of boxes to be stacked so as to engage stacks thereof to prevent tipping of the stacks when the latter are placed upon a pallet 26.

Considering now the operation of the present invention, and referring to the drawings, boxes 14 are received from such as conveyor means 16 wherefrom they slide down the guides 17 while rotating some ninety degrees. Boxes from the conveyor means 16 are deposited upon the conveyor 11 generally in double rows and are conveyed thereby to the box roller section 21 whereon they are pushed by the conveyor. The boxes on the roller section move by their own momentum received on the conveyor 11 and also by gravity to the stop bar 22, so that upon the roller section the boxes are contiguous from the bar back and form two solid rows next to each other with the outer edges of the rows overhanging the edges of the roller section. While the boxes 14 are fed onto the roller section 21, pallets 26 are fed onto the pallet conveyor belt 28 from the pallet roller sections 27 and this conveyor belt turns until the first pallet is disposed partially in the loading zone with one box width of the length thereof beyond the pivotal axis of the elevator arms, i.e., the axis of the shafts 36. At this point the pallet conveyor stops.

When the number of boxes desired in a stack have piled up behind the stop bar 22, and with the extension arms in lowered position, as shown in FIGURE 4, the second hydraulic cylinder 44 is actuated to draw the pistons thereof together, by conventional means not shown. The cylinder 44 thus moves the extension arms inwardly into gripping relation with the box ends and the lower portion 39 of the arm extensions fits under the boxes where they overhang the roller section. Immediately following gripping of the two adjacent rows of boxes by the arms 34 the first hydraulic cylinder 42 is actuated to withdraw the piston thereof and thereby to pivot the arms simultaneously from their first position along section 21 about the shafts 36 into their second a vertical position outwardly adjacent the lower end of roller section 21 and immediately above the exposed end of the pallet 26. At this point the second hydraulic cylinder is controlled to extend the pistons thereof whereby the boxes are released to rest upon the pallet in two stacks. As may be seen in FIGURES 5 and 6, the boxes on the roller section are initially disposed in slightly spaced rows which are then pressed together by the arms 34 when the latter close upon the boxes to remove same.

Following arm separation to stack the boxes, the first hydraulic cylinder 42 is actuated to extend the piston thereof for pivoting the arms again downward in their parallel arcuate paths to their first position beside the box roller section for repetition of the foregoing. Also following release of the boxes onto the pallet in stacks the pallet conveyor belt drive unit 32 is energized to move the pallet 26 exactly the width of a box so that the subsequent stacks of boxes will be placed against the preceding stacks.

The foregoing steps are repeated until the pallet is filled with stacks of boxes, at which time the above-noted pallet movement places the pallet entirely upon the output roller section 33 whereupon the filled pallet moves by gravity down the incline of the roller section out of the way of the apparatus and is loaded upon trucks or otherwise disposed of to make way for following loaded pallets.

As regards control of the present invention conventional hydraulic systems are suitable for operating the cylinders 42 and 43 and suitable intermittent drive means 32 for the pallet conveyor are known. Although presently employed units are semi-automatic in that an operator initiates extension arm operation, full automation is quite possible with known equipment. As to the succession of cylinder operation and conveyor belt actuation, quite simple control means are available, it being required only that cylinder operations follow each other as may be readily dictated by pressure and position controls and that the belt drive means 32 be set to turn a predetermined amount following receipt of a signal as from pressure increase in the second hydraulic cylinder following release of the boxes.

Of further note in the present invention is the adaptability thereof to the insertion of a further roller section extending from the box roller section 21 to a point above the output roller section 33. With such an additional roller section provided and with the stop bar 22 lowered out of the way, as described above, boxes roll right on through the apparatus and drop onto the output roller 33 while inverting during the drop so as to be individually deliverable. This alternate operation is particularly desirable in that under certain circumstances a number of individual boxes may be desired without being stacked and the stacking elements in no way interfere with the flow of boxes through the apparatus.

What is claimed is:

1. Handling apparatus comprising a conveyor feed section adapted to receive objects thereon and having stop means at an end thereof whereby objects pile up thereon, arms positioned on opposite sides of said feed means and pivotally mounted adjacent said end for movement between a first position generally parallel to said section and a second position generally normal thereto, said arms having means thereon extending for substantially the entire length thereof and movable laterally of said feed means to selectively grip objects upon same and to release said objects, powered means for pivoting said arms away from said feed means into said second position with objects gripped therein, pallet feed means disposed in spaced subjacent relation to said arms and adapted to dispose pallets in position beneath said pivoted arms whereby laterally outward movement of said laterally movable means stacks objects upon said pallets, and means periodically moving said pallets for receiving successive stacks of objects thereon.

2. Handling apparatus comprising means aligning objects contiguously in rows and moving them in one direction in a generally horizontal path, arms disposable on opposite sides of said rows of objects and including gripper means extending along said arms movable laterally of said path into and out of gripping relation for gripping and releasing rows of objects, means for pivoting said arms between a vertical position whereby rows of objects gripped by said gripper means are rotated into stacks and a horizontal position adjacent said first mentioned means for removing objects therefrom, and means moving object-receiving bases in said one direction into successive positions to receive stacks of objects released by said arms.

3. Apparatus for stacking boxes upon pallets comprising an inclined roller section adapted to receive boxes at the upper end thereof, stop means across the lower end of said roller section for arresting box travel whereby boxes are aligned contiguously in at least one row on said roller section, a pair of extension arms mounted to move about an axis disposed transversely of said roller section and adjacent said stop means on opposite sides of said roller section, means including an intermittently driven conveyor belt for receiving pallets and disposing same at predetermined positions adjacent said stop means, powered means engaging said extension arm for selectively moving same together and apart along substantially the entire length thereof for gripping and releasing rows of boxes on said roller section, and powered means for moving said arms in its arcuate path about said axis from a position parallel and adjacent to opposite sides of said roller section to a substantially vertical position above said pallet positions to dispose gripped rows of boxes in vertical stacks that are releasable upon pallets.

4. Apparatus for stacking boxes upon pallets comprising an inclined roller section adapted to receive boxes at the upper end thereof whereby same roll thereon, a bar disposed across the lower end of said roller section above same for arresting box traverse thereof whereby rows of contiguous boxes are formed longitudinally of said roller section, pallet feed means disposed in spaced subjacent relation to said roller section including an intermittently energized conveyor adapted to receive pallets and move same to a loading position beyond the bar across said roller section, a pair of arms pivotable about a fixed axis adjacent and parallel to said bar and including longitudinally extending gripper means movable longitudinally of said axis from a first position laterally outside said roller section to a second position in close relation to said roller section for gripping rows of boxes thereon, powered means connected to said arms for pivoting same relative to said roller section about said axis from a position in the plane of and extending along said roller section to a substantially vertical position generally normally related to said roller section and above a pallet disposed on the conveyor thereof, and powered means connected between said arms for moving said gripper means into said second position for gripping rows of boxes and into said first position releasing same following arm pivoting above a pallet.

5. Apparatus for loading containers upon bases comprising first feed means adapted to continuously receive containers for movement in one direction thereon toward a loading zone and align same in rows, arms disposed on opposite sides of said feed means for selective transverse movement into and out of gripping relation with rows of containers on said feed means and for movement relative to said feed means about an axis above and normal to said feed means between alignment with container rows and a substantially vertical position in the loading zone, second feed means adapted to receive bases for stacking containers thereon and movable in said one direction through said loading zone in intermittent fashion to displace bases in said loading zone one stack width for each pivoting cycle of said arms whereby containers are positioned in successive contiguous stacks upon bases in said loading zone.

6. Apparatus of the character described including a longitudinally extending conveyor adapted to receive articles thereon and including stop means adjacent an end thereof, longitudinally extending pallet feed means disposed subjacent said conveyor and arranged for sequential intermittent advance of a pallet positioned thereon beyond said end of said conveyor, article gripping means normally positioned along opposite sides of said conveyor, means selectively moving said last named means towards and from each other to selectively clamp and release a plurality of articles, and means pivotally moving said gripper means relative to said conveyor from said normal position to a vertical position generally normally related to said conveyor wherein the lower end thereof is adjacent a pallet on said pallet feed means.

7. Apparatus as claimed in claim 6, in which said gripping means includes opposed arms with each of such arms having an inwardly directed planar portion adapted to engage the under surface of edge portions of articles on said article conveyor.

References Cited in the file of this patent

UNITED STATES PATENTS

| | | |
|---|---|---|
| 1,870,207 | Washburne | Aug. 2, 1932 |
| 2,508,698 | Von Beren | May 23, 1950 |
| 2,701,650 | Stevenson | Feb. 8, 1955 |
| 2,800,992 | Kuper | July 30, 1957 |